United States Patent
Ikeda (10) Patent No.: US 11,255,754 B2
(45) Date of Patent: Feb. 22, 2022

(54) SPECIMEN TEST APPARATUS CONTROLLED IN PART BASED ON TIRE DIAMETER IN DEFORMED STATE

(71) Applicant: HORIBA, LTD., Kyoto (JP)

(72) Inventor: Hiroyuki Ikeda, Kyoto (JP)

(73) Assignee: HORIBA, LTD., Kyoto (JP)

( * ) Notice: Subject to any disclaimer, the term of this patent is extended or adjusted under 35 U.S.C. 154(b) by 92 days.

(21) Appl. No.: 16/811,399

(22) Filed: Mar. 6, 2020

(65) Prior Publication Data

US 2020/0284695 A1  Sep. 10, 2020

(30) Foreign Application Priority Data

Mar. 8, 2019  (JP) .............................. JP2019-043100

(51) Int. Cl.
*G01M 17/02* (2006.01)
*G01L 3/16* (2006.01)

(52) U.S. Cl.
CPC ............... *G01M 17/02* (2013.01); *G01L 3/16* (2013.01)

(58) Field of Classification Search
CPC ........ G01L 3/16; G01M 13/025; G01M 17/02
See application file for complete search history.

(56) References Cited

U.S. PATENT DOCUMENTS

2017/0336289 A1* 11/2017 Pfister ................. G01M 13/025

FOREIGN PATENT DOCUMENTS

| JP | 04-042013 A | 2/1992 |
|----|-------------|--------|
| JP | 04-238239 A | 8/1992 |
| JP | 07-181110 A | 7/1995 |
| JP | 2017-524937 A | 8/2017 |
| JP | 2018-017623 A | 2/2018 |

OTHER PUBLICATIONS

Redrouthu, Chalmers University of Technology Master's Thesis, Tyre Modelling for Rolling Resistance, 2014 (Year: 2014).*
EESR dated Aug. 3, 2020 issued for European Patent Application No. 20160967.4, 7 pgs.
Office Action dated Sep. 7, 2021 issued in JP patent application No. 2019-043100, 6 pgs.

* cited by examiner

*Primary Examiner* — Eric S. McCall
*Assistant Examiner* — Timothy P Graves
(74) *Attorney, Agent, or Firm* — Brooks Kushman P.C.

(57) ABSTRACT

The present invention is one that reproduces behavior close to an actual run of a vehicle in a test using a loading device, and is a specimen test apparatus that tests a specimen that is a vehicle or a part of a vehicle. The vehicle test apparatus includes: a loading device that is connected to a rotating shaft of the specimen and gives running resistance to the rotating shaft; a storage part that stores tire diameter data indicating the relationship between a running state of the specimen and a tire diameter; and a control part that, from the tire diameter data, calculates a tire diameter corresponding to a running state of the specimen, and controls the loading device with use of running resistance obtained from the calculated tire diameter.

9 Claims, 5 Drawing Sheets

(A) AT CONSTANT SPEED (AT REST)

(B) AT ACCELERATION

SPECIMEN TEST APPARATUS CONTROLLED IN PART BASED ON TIRE DIAMETER IN DEFORMED STATE

CROSS-REFERENCE TO RELATED APPLICATION

This application claims priority to Japanese Application No. 2019-043100, filed Mar. 8, 2019, the disclosure of which is incorporated in its entirety by reference herein.

TECHNICAL FIELD

The present invention relates to a specimen test apparatus that tests a specimen that is a vehicle or a part of a vehicle.

BACKGROUND ART

As an apparatus that tests a vehicle drive train such as a power train, as disclosed in Patent Literature 1, there has been one that connects a dynamometer to a rotating shaft (hereinafter also referred to as an axle) of a vehicle drive train and gives running resistance to the axle to perform a test simulating an actual run.

In this case, the running resistance given from the dynamometer to the axle is calculated from running speed that is obtained from the rotation speed of the axle and a preliminarily inputted tire diameter. In addition, the dynamometer is controlled so that the running resistance is given to the axle. Note that the preliminarily inputted tire diameter is set to a fixed value determined based on specifications.

However, in the case of an actual run, tires must be deformed depending on a running state of a vehicle, such as the speed or acceleration of the vehicle (see FIG. 3), and a test apparatus using a tire diameter as a fixed value cannot accurately reproduce an actual run of a vehicle.

CITATION LIST

Patent Literatures

Patent Literature 1: Japanese Unexamined Patent Application Publication No. 7-181110

SUMMARY OF INVENTION

Technical Problem

Therefore, the present invention has been made in order to solve the above-described problem, and a main object thereof is to accurately reproduce an actual run of a vehicle in a test using a dynamometer.

Solution to Problem

That is, the specimen test apparatus according to the present invention is one that tests a specimen that is a vehicle or a part of a vehicle, and includes: a loading device that is connected to a rotating shaft of the specimen and gives running resistance to the rotating shaft; a storage part that stores tire diameter data indicating the relationship between a running state of the specimen and a tire diameter; and a load control part that, from the tire diameter data, calculates a tire diameter corresponding to a running state of the specimen, and controls the loading device with use of running resistance obtained from the calculated tire diameter.

Such a specimen test apparatus calculates a tire diameter corresponding to a running state of the specimen with use of the tire diameter data indicating the relationship between a running state of the specimen and a tire diameter, and controls the loading device with use of running resistance obtained from the calculated tire diameter, and can therefore perform a test taking account of a change in tire diameter occurring in a running state of the specimen. As a result, when using the loading device to test the specimen that does not run on tires, an actual run of a vehicle can be accurately reproduced. In addition, a run of a vehicle on a chassis dynamometer can also be accurately reproduced, and a vehicle test on a chassis dynamometer and a vehicle drive train test can be combined.

Specifically, it is desirable that the load control device gives running resistance corresponding to running speed obtained from the calculated tire diameter and the rotating shaft of the specimen to the loading device.

It is desirable that the tire diameter data is one indicating the relationship between at least an of the rotation speed of the rotating shaft of the specimen and the running speed and acceleration of the specimen, and a tire diameter, and from the tire diameter data, the load control part calculates a tire diameter corresponding to at least any of the rotation speed of the rotating shaft of the specimen, and the running speed and the acceleration of the specimen.

As a specific tire diameter calculation method, for example, the following is conceivable.

The load control part calculates temporary running speed or temporary acceleration from the rotation speed of the rotating shaft of the specimen and a set tire diameter, and calculates a tire diameter from the calculated temporary running speed or the calculated temporary acceleration and the tire diameter data. Here, the set tire diameter may be an initial fixed value determined by specifications or the like or may be a tire diameter set immediately before.

The load control part can also calculate any of the rotation speed of the rotating shaft of the specimen, and the running speed and the acceleration of the specimen from a predetermine running pattern used to control the specimen, and from the tire diameter data, calculate a tire diameter corresponding to any of the rotation speed of the rotating shaft of the specimen, and the running speed and the acceleration of the specimen. Here, the predetermined running pattern is one determined by, for example, laws and regulations of each country, and corresponds to a mode such as the "JC08 mode" in Japan, the "NEDC mode" in Europe, the "FTP mode" in USA, or WLTP (Worldwide harmonized Light vehicles Test Procedure).

When the specimen is a four-wheel drive vehicle drive train, it is conceivable to employ the following configuration.

That is, the storage part stores front wheel tire diameter data indicating the relationship between a running state of the specimen and a front wheel tire diameter and rear wheel tire diameter data indicating the relationship between a running state of the specimen and a rear wheel tire diameter.

Also, the loading device includes a front wheel side loading device connected to a front wheel rotating shaft and a rear wheel side loading device connected to a rear wheel rotating shaft.

Further, the load control part calculates a front wheel tire diameter corresponding to a running state of the specimen from the front wheel tire diameter data, calculates a rear wheel tire diameter corresponding to the running state of the specimen from the rear wheel tire diameter data, and controls the respective loading devices so that running resistances calculated with use of first running speed obtained from the calculated front wheel tire diameter and the rotation speed of the front wheel rotating shaft and second running speed obtained from the calculated rear wheel tire diameter and the rotation speed of the rear wheel rotating shaft are given.

Even when the calculated first running speed and second running speed are mutually different, the ground speed of a vehicle is uniquely determined. For this reason, in order to further accurately simulate an actual run of a vehicle, it is desirable that the load control part controls the rotation speed of the front wheel side loading device and the rotation speed of the rear wheel side loading device so that the first running speed and the second running speed coincide with each other.

Also, a specimen test method according to the present invention is one that connects a loading device to a rotating shaft of a specimen that is a vehicle or a part of a vehicle, and gives running resistance to the rotating shaft to test the specimen, and the specimen test method calculates a tire diameter corresponding to a running state of the specimen from tire diameter data indicating the relationship between a running state of the specimen and a tire diameter, and controls the loading device with use of running resistance obtained from the calculated tire diameter.

Further, a specimen test program according to the present invention is one for connecting a loading device to a rotating shaft of a specimen that is a vehicle or a part of a vehicle, and giving running resistance to the rotating shaft to test the specimen, and the specimen test program instructs a computer to include functions as: a storage part that stores tire diameter data indicating the relationship between a running state of the specimen and a tire diameter; and a control part that, from the tire diameter data, calculates a tire diameter corresponding to a running state of the specimen, and controls the loading device with use of running resistance obtained from the calculated tire diameter.

Advantageous Effects of Invention

According to the present invention configured as described, an actual run of a vehicle can be accurately reproduced in a test using a dynamometer.

DESCRIPTION OF EMBODIMENTS

In the following, one embodiment of the specimen test apparatus according to the present invention will be described with reference to the drawings.

A specimen test apparatus 100 of the present embodiment is one for performing a test simulating an actual run of a vehicle on a specimen 10 that is a part of the vehicle, and evaluating the performance and the like of the specimen 10. The specimen 10 in the present embodiment is a vehicle drive train, and specifically, includes an engine 11 and a power train 12 (also referred to as a drive line). In addition, the power train 12 is one including at least one of a transmission (manual, automatic, or CVT), a differential gear, an axle, a drive shaft, and the like. Here, the power train 12 may be one for four-wheel drive illustrated in FIG. 1, for front-wheel drive, or for rear-wheel drive. Further, the specimen test apparatus 100 may be one that tests a specimen that is a hybrid vehicle or a part of it (e.g., a driving motor or anther drive train), or tests a specimen that is an electric vehicle or a part of it (e.g., a driving motor or another drive train).

Figure 1:
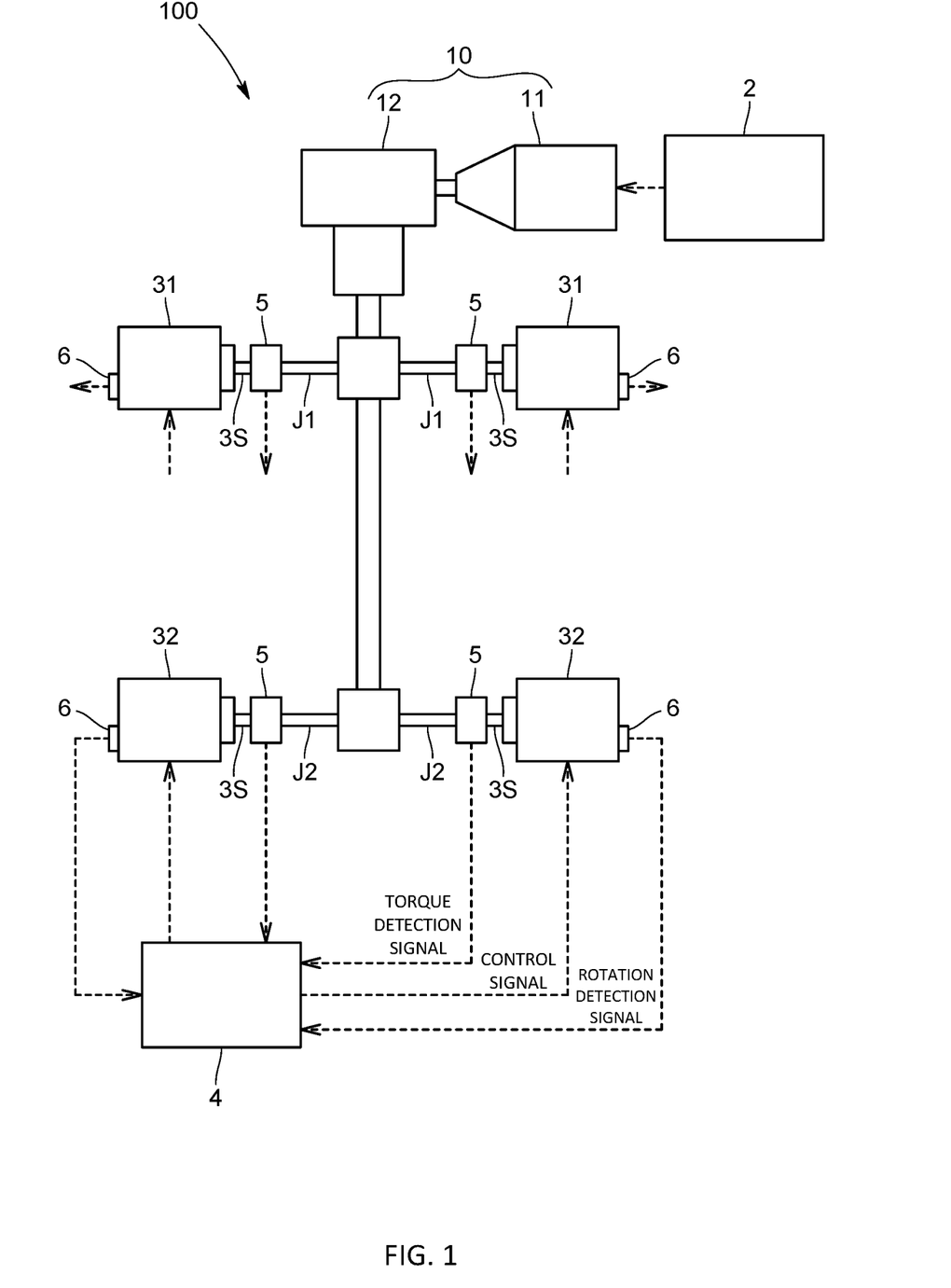
FIG. 1 is an overall schematic diagram of a specimen test apparatus (available for four-wheel drive) according to the present embodiment.

Specifically, as illustrated in FIG. 1, the specimen test apparatus 100 includes: a drive train control device 2 that controls the vehicle drive train 10; two front wheel side dynamometers 31 that are respectively connected to two front wheel rotating shafts J1 of the power train 12; two rear wheel side dynamometers 32 that are respectively connected to two rear wheel rotating shafts J2 of the power train 12; and a load control device 4 that controls the respective dynamometers 31 and 32. In addition, the vehicle drive train 10 as the specimen and the respective dynamometers 31 and 32 are arranged in a test room, and the respective control devices 2 and 4 may be arranged in a control room different from the test room.

The drive train control device 2 is one that controls the engine 11 and the power train 12 under predetermined test conditions. Specifically, the drive train control device 2 controls a throttle opening level by inputting a throttle opening level signal to the engine 11, as well as controls a gear ratio and the like by inputting a control signal to the transmission of the power train 12.

Also, when the vehicle drive trains 10 is equipped with an automatic driving robot, the drive train control device 2 is one that controls the throttle opening level of the engine 11 and the transmission (in particular, the selection of a manual reduction gear ratio (gear) and the operation of a clutch) by inputting control signals to respective actuators of the automatic driving robot. The respective actuators include, for example, ones for an accelerator operation part, brake operation part, shift lever operation part, clutch operation part, and the like.

The respective loading devices 31 and 32 are ones that simulate running resistances acting on wheels connected to the respective rotating shafts J1 and J2, and configured of absorption dynamometers. Rotating shafts 3S of the respective loading devices 31 and 32 are connected to the respective rotating shafts J1 and J2 via torquemeters 5. Also, the respective loading devices 31 and 32 are provided with rotation detectors 6 for detecting the rotation speeds of the rotating shafts 3S. In addition, the rotation detectors 6 may be ones that are provided on the vehicle drive train 10 side to detect the rotations of the rotating shafts J1 and J2. Further, the rotation detectors 6 are not necessarily essential components, and for example, the rotation speeds may be calculated from control signals or the like from the load control device 4.

The load control device 4 is one that controls the respective loading devices 31 and 32 under predetermined test conditions and performs rotation speed control and torque control on the basis of detection signals from the torquemeters 5 and the rotation detectors 6.

In addition, the drive train control device 2 and the load control device 4 are dedicated or general-purpose computers including a CPU, an internal memory, an AD converter, an input/output interface, input means such as a mouse or a keyboard, display means such as a display DP, and the like. Alternatively, the drive train control device 2 and the load control device 4 may be configured of a common computer or configured of multiple computers having their functions.

Further, the specimen test apparatus 100 of the present embodiment is configured to be able to reproduce behavior simulating an actual run of a vehicle in a vehicle drive train test using the loading devices 31 and 32.

Figure 3:
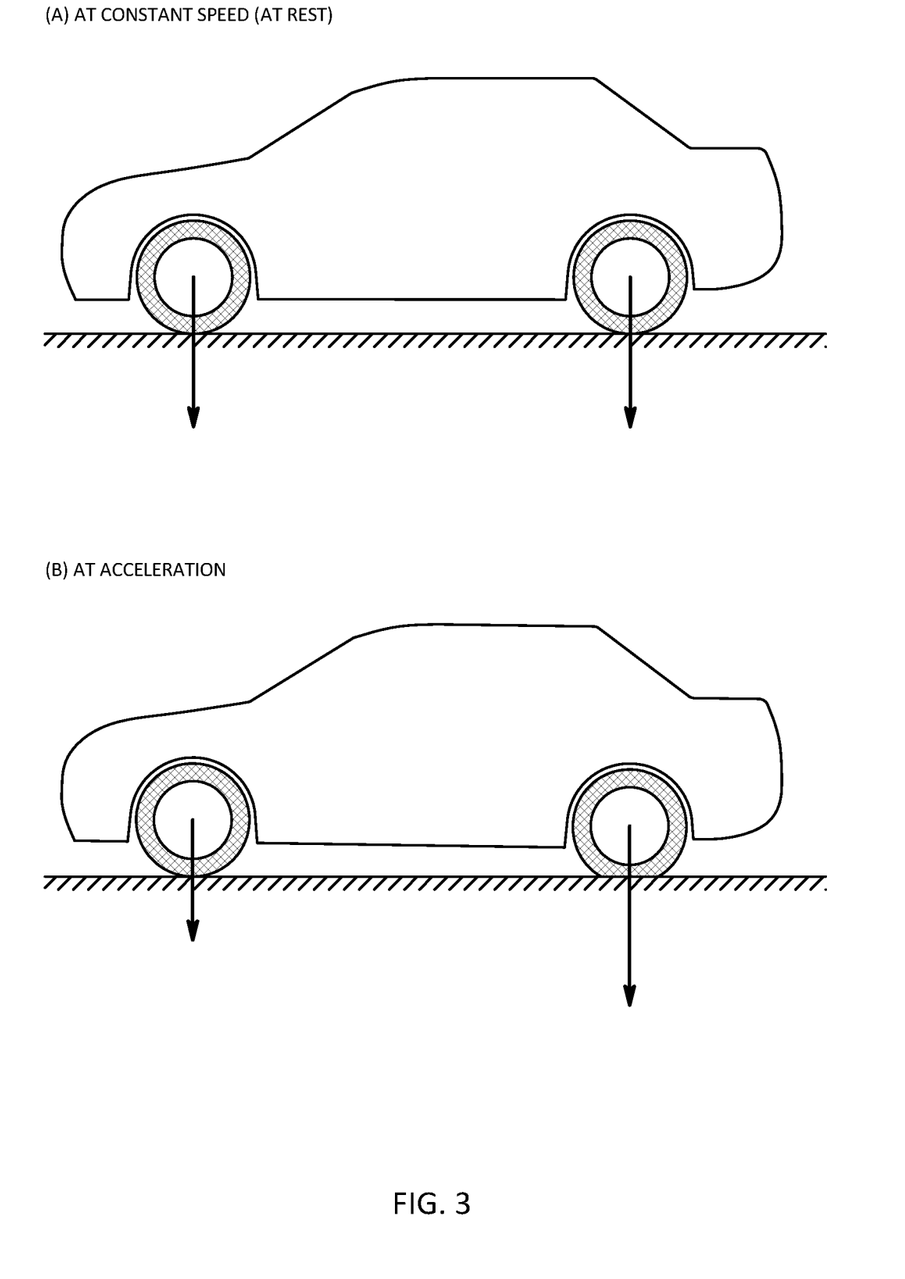
FIG. 3 is a schematic diagram illustrating vehicle states (A) at rest and (B) at acceleration.

The load control device 4 is one that controls the respective loading devices 31 and 32 in consideration of changes in tire diameters occurring at the time of a run, such as at acceleration (including deceleration) during an actual run of a vehicle (see FIG. 3).

Figure 2:
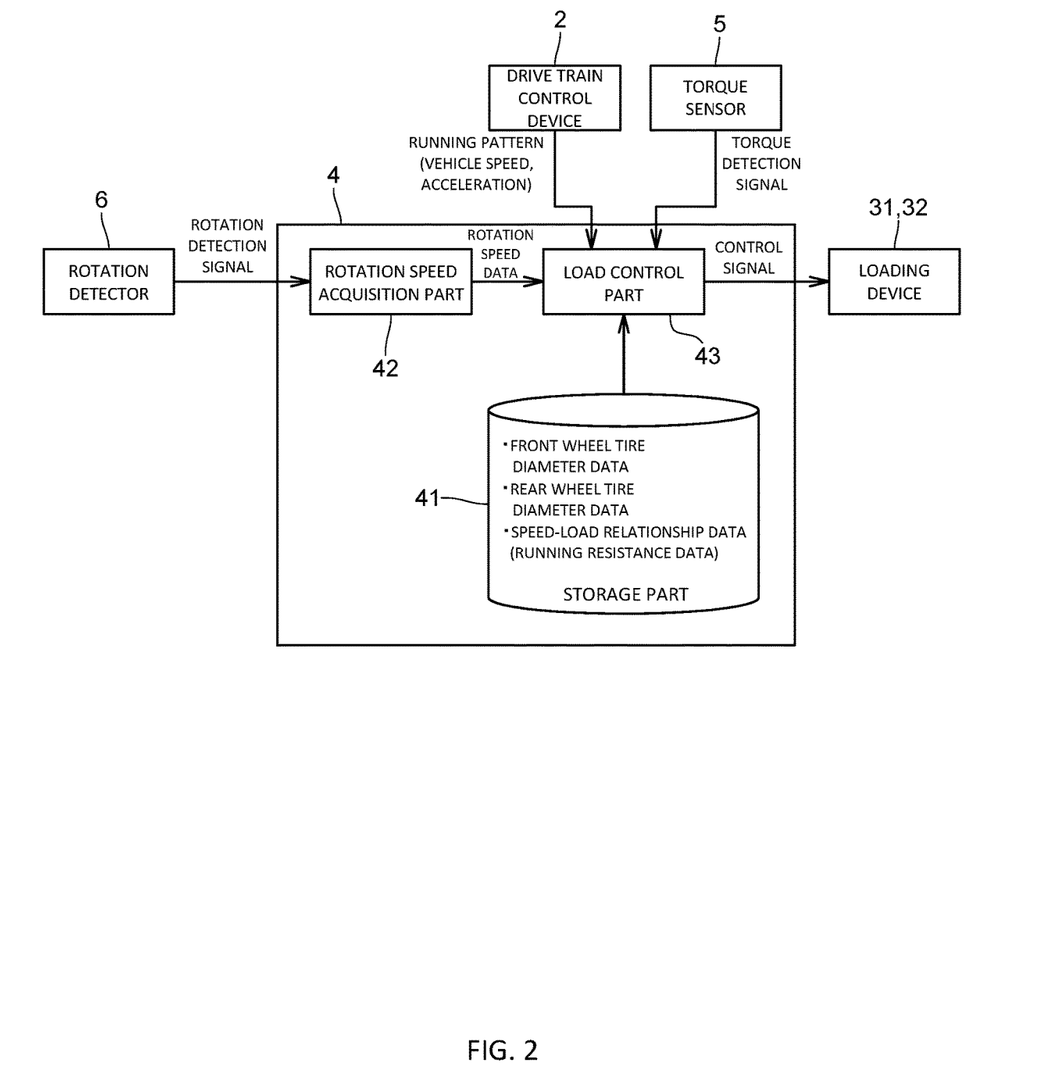
FIG. 2 is a functional block diagram of a load control device according to the same embodiment.

Specifically, the load control device 4 includes: a storage part 41 that stores tire diameter data indicating the relationship between a running state of the specimen 10 and a tire diameter; a rotation speed acquisition part 42 that calculates the rotation speeds of the rotating shafts 3S (the rotation speeds of the rotating shafts J1 and J2) from the detection signals from the rotation detectors 6 and a load control part 43 that calculates a tire diameter corresponding to a running state of the specimen 10 from the tire diameter data, and controls the respective loading devices 31 and 32 so that running resistances calculated from running speeds obtained from the calculated tire diameter and the rotation speeds of the rotating shafts 3S (the rotation speeds of the rotating shafts J1 and J2) are given.

The storage part 41 stores front wheel tire diameter data indicating the relationship between a running state of the specimen 10 and a front wheel tire diameter and rear wheel tire diameter data indicating the relationship between a running state of the specimen 10 and a rear wheel tire diameter. Here, as the running state of the specimen 10, for example, the rotation speed of the rotating shafts 3S of the specimen 10 (including a value related, to the rotation speed), the running speed, acceleration or the like of the specimen 10 can be cited. The running speed or acceleration of the specimen 10 is running speed or acceleration obtained by driving of the specimen 10 by the drive train control device 2.

The front wheel tire diameter data is one indicating the relationship between the rotation speed of the rotating shaft 3S of the specimen 10, or the running speed or acceleration of the specimen 10 and a front wheel tire diameter at the rotation speed, the running speed, or the acceleration. The front wheel tire diameter data may be actual measurement data on the front wheel tire diameter measured at the time of an actual run in a predetermined running mode such as WLTP, or may be data calculated by simulation using, for example, an external simulator or the like. As the actual measurement data, in the case of an actual run or a run on a chassis dynamometer, the front tires may be imaged by a camera and from the resulting camera images, the front wheel tire diameter may be obtained, or the front wheel tire diameter may be obtained from the rotation speed and running speed of the front wheel rotating shafts J1 obtained at the time of an actual run or a run on a chassis dynamometer. Here, the running speed may be one obtained from a speedometer of a vehicle or may be one obtained from a separately provided speedometer. Further, running speed obtained at the time of a run on a chassis dynamometer can also be obtained by multiplying the rotation speed and roller diameter of a chassis roller by each other. The actual measurement data may be adapted to be written in the storage part 41 during driving of a vehicle.

Similarly, the rear wheel tire diameter data is one indicating the relationship between the rotation speed of the rotating shafts 3S of the specimen 10, or the running speed or acceleration of the specimen 10 and a rear wheel tire diameter at the rotation speed, the running speed, or the acceleration. The rear wheel tire diameter data may be actual measurement data on the rear wheel tire diameter measured at the time of an actual run in a predetermined running mode such as WLTP, or may be calculation data on the rear wheel tire diameter calculated by simulation using, for example, an external simulator or the like. As the actual measurement data, in the case of an actual run or a run on a chassis dynamometer, the rear tires may be imaged by a camera and from the resulting camera images, the rear wheel tire diameter may be obtained, or the rear wheel tire diameter may be obtained from the rotation speed and running speed of the rear wheel rotating shafts J2 obtained at the time of an actual run or a run on a chassis dynamometer. Here, the running speed may be one obtained from a speedometer of a vehicle or may be one obtained from a separately provided speedometer. Further, running speed obtained at the time of a run on a chassis dynamometer can also be obtained, by multiplying the rotation speed and roller diameter of a chassis roller by each other. The actual measurement data may be adapted to be written in the storage part 41 during driving of a vehicle.

The rotation speed acquisition part 42 is one that receives the detection signals of the respective rotation detectors 6 to calculate the rotation speeds of the respective rotating shafts 3S (i.e., the rotation speeds of the rotating shafts J1 and J2) from the detection signals. Further, the rotation speed acquisition part 42 transmits rotation speed data indicating the calculated rotation speeds to the control part 43. In addition, the rotation speed acquisition part 42 may be one that acquires rotation speed data externally calculated from the detection signals of the rotation detectors 6.

The load control part 43 calculates a front wheel tire diameter corresponding to a running state of the specimen 10 from the front wheel tire diameter data, calculates a rear wheel tire diameter corresponding to the running state of the specimen 10 from the rear wheel tire diameter data, and controls the respective loading devices 31 so that running resistances calculated with use of first running speed obtained from the calculated front wheel tire diameter and the rotation speed of the front wheel rotating shafts J1, and second running speed obtained from the calculated rear wheel tire diameter and the rotation speed of the rear wheel rotating shafts J2 are given to the respective rotating shafts J1 and J2.

As a method for calculating the respective tire diameters, the following are conceivable. Note that as a method for calculating the respective tire diameters, without limitation to the following (1) to (3), various methods can be employed.

(1) In the Case where Tire Diameter Data Indicates the Relationship between the Rotation Speed of Rotating Shafts 3S of the Specimen 10 and t Tire Diameter In this case, on the basis of the rotation speed of the rotating shafts 3S (the rotation speed of the front wheel rotating shafts J1) obtained from the detection signals of the rotation detectors 6, or the like, and the front wheel tire diameter data, the load control part 43 calculates a front wheel tire diameter corresponding to a running state of the specimen 10. Also, on the basis of the rotation speed of the rotating shafts 3S (the rotation speed of the rear wheel rotating shafts J2) obtained from the detection signals of the rotation detectors 6, or the like, and the rear wheel tire diameter data, the load control part 43 calculates a rear wheel tire diameter corresponding to the running state of the specimen 10.

(2) In the Case where Tire Diameter Data Indicates the Relationship between the Running Speed of the Specimen 10 and a Tire Diameter In this case, the load control part 43 calculates temporary first running speed (or temporary first acceleration) from the rotation speed of rotating shafts 3S (the rotation speed of the front wheel rotating shafts J1) obtained by the detection signals from the rotation detectors 6, or the like, and a set front wheel tire diameter, and from the calculated temporary first running speed and the front wheel tire diameter data, calculates the front wheel tire diameter. Also, the load control part 43 calculates temporary second running speed (or temporary second acceleration) from the rotation speed of rotating shafts 3S (the rotation speed of the rear wheel rotating shafts J2) obtained by the detection signals from the rotation detectors 6, or the like, and a set rear wheel tire diameter, and from the calculated temporary second running speed and the rear wheel tire diameter data, calculates the rear wheel tire diameter.

(3) In the Case where Tire Diameter Data Indicates the Relationship between the Running Speed or Acceleration of the Specimen 10 and a Tire Diameter The load control part 43 calculates the running speed or acceleration of the specimen 10 from a running mode given to the drive train control device 2, and from the calculated running speed or acceleration and the respective pieces of tire diameter data, calculates the respective tire diameters. Specifically, on the basis of the front wheel tire diameter data and the running mode given to the drive train control device 2, the load control part 43 calculates a front wheel tire diameter corresponding to a running state of a vehicle to be simulated. Also, on the basis of the rear wheel tire diameter data and the running mode given to the drive train control device 2, the load control part 43 calculates a rear wheel tire diameter corresponding to the running state of the vehicle to be simulated.

In addition, the load control part 43 calculates the first running speed by the front wheels on the basis of the calculated front wheel tire diameter and the rotation speed of the front wheel rotating shafts J1 obtained bar the rotation speed acquisition part 42. Also, the load control part 43 calculates the second running speed by the rear wheels on the basis of the calculated rear wheel tire diameter and the rotation speed of the rear wheel rotating shafts J2 obtained by the rotation speed acquisition part 42.

Further, on the basis of the calculated first running speed and second running speed, the load control part 43 controls the respective loading devices 31 and 32 so that, from predetermined speed-load relationship data (running resistance data), loads (running resistances) corresponding to the running speeds are applied to the respective rotating shafts J1 and J2. In addition, the speed-load relationship data is one corresponding to a running mode such as WLTP, and preliminarily inputted by an operator or the like and stored in the storage part 41 provided in the load control device 4.

For example, since the first running speed and the second running speed arcs the same during an actual run of a vehicle, the load control part 43 obtains the average speed of the first running speed and the second running speed, and from the average speed and the speed-load relationship data, generates control signals to be inputted to the respective loading devices 31 and 32. Then, the load control part 43 inputs the control signals to a loading device 3 to perform load control on the respective loading devices 31 and 32. In addition, besides the average speed of the first running speed and the second running speed, from running speed obtained from the first running speed and the second running speed and the speed-load relationship data, the control signals to be inputted to the respective loading devices 31 and 32 may be generated. As the running speed determined from the first running speed and the second running speed, for example, it is conceivable to calculate it by respectively weighting the first running speed and the second running speed.

Further, since the first running speed and the second running speed must be the same during an actual run of a vehicle, the load control part 43 controls the rotation speed of the front wheel side loading devices 31 and the rotation speed of the rear wheel side loading devices 32 so that the first running speed and the second running speed coincide with each other.

Effect of the Present Embodiment

Such a specimen test apparatus 100 calculates tire diameters corresponding to a running state of the specimen 10 with use of the pieces of tire diameter data indicating the relationships between a running state of the specimen 10 and tire diameters, and controls the loading devices 31 and 32 with use of running resistances obtained from the calculated tire diameters, and can therefore perform a test taking account of changes in tire diameters occurring in a running state of the specimen 10. As a result, when using the loading devices 31 and 32 to test the specimen 10 that does not run on tires, an actual run of a vehicle can be accurately reproduced. Also, a run of a vehicle on a chassis dynamometer can also be accurately reproduced, and a vehicle test on a chassis dynamometer and a vehicle drive train test can be combined.

Other Embodiments

Note that the present invention is not limited to the above-described embodiment.

Figure 4:
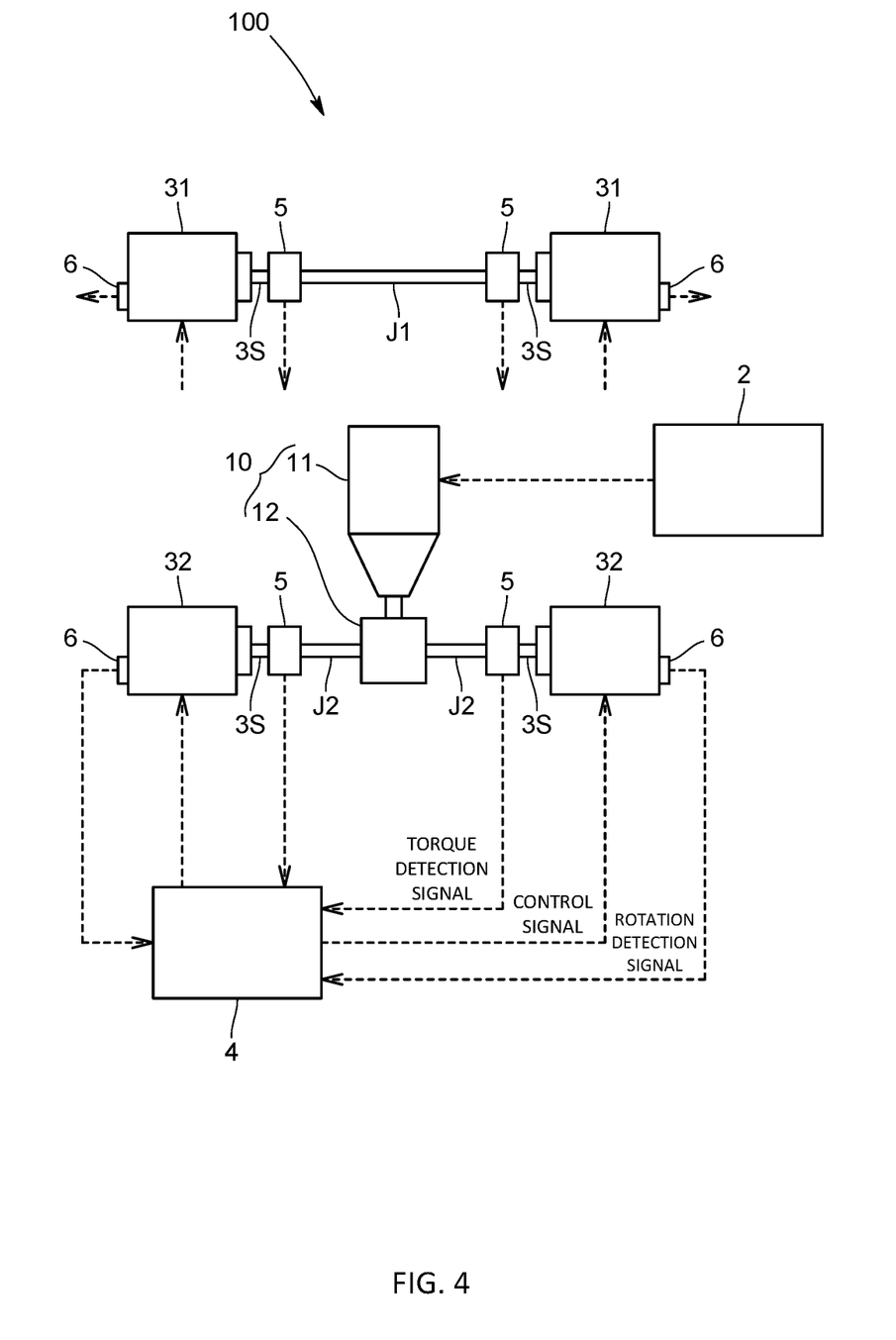
FIG. 4 is an overall schematic diagram of a specimen test apparatus (available for two-wheel drive) according to a variation.

For example, as illustrated in FIG. 4, the specimen test apparatus 100 of the present invention may be one that tests a two-wheel drive vehicle drive train as the specimen 10. In this case, in addition to connecting the loading devices 32 to the rotating shafts J2 of the driving wheels, the loading devices 31 may be adapted to be connected to the rotating shafts J1 of the non-driving wheels. FIG. 4 illustrates an example of rear wheel drive, but front wheel drive is also applicable.

Figure 5:
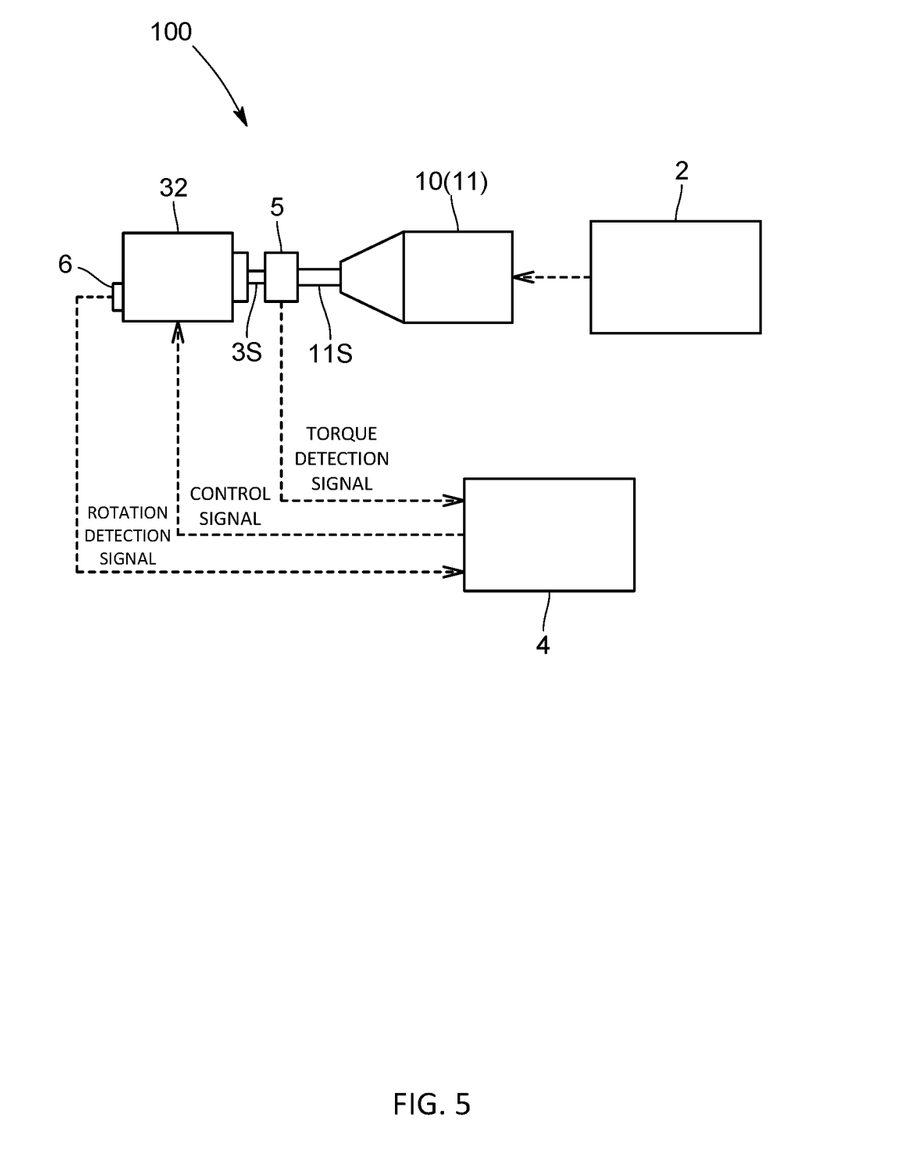
FIG. 5 is an overall schematic diagram of a specimen test apparatus (available for an engine) according to another variation.

Also, as illustrated in FIG. 5, the specimen test apparatus 100 of the present invention may be one that tests the engine 11 alone as the specimen 10. In this case, the loading device 3 is connected to the output shaft 11S of the engine 11. Besides, the specimen test apparatus 100 may be one that tests a vehicle attached with a free wheel hub.

Further, in the above-described embodiment, the tire diameter of the front wheels and the tire diameter of the rear wheels are the same in specifications; however, the tire diameter of the front wheels and the tire diameter of the rear wheels may be different in specifications.

In addition, the above-described embodiment is configured to calculates the tire diameters of the front and rear wheels on the basis of a running state of the specimen, and on the basis of the calculated tire diameters, set running resistances, but may be configured to calculate the tire diameters of the left and right wheels in a running state of the specimen, and on the basis of the calculated tire diameters, set running resistances. In such a configuration, in addition to a straight run of a vehicle, a state during a circular run (curve run) can also be accurately simulated.

The above-described embodiment is one in which the load control part 43 calculates the tire diameters, but may be configured to calculate the tire diameters using an external arithmetic unit and input the calculated tire diameters to the load control part 43.

In addition, in the above-described embodiment, the engine 11 of the specimen 10 may be replaced by a driving dynamometer.

Besides, it should be appreciated that the present invention is not limited to the embodiments described above, but can be variously modified without departing from the scope thereof.

REFERENCE SIGNS LIST

100: Specimen test apparatus
10: Specimen
J1: Front wheel rotating shaft (rotating shaft)
J2: Rear wheel rotating shaft (rotating shaft)
2: Drive train control device
31: Front wheel loading device
32: Rear wheel loading device
4: Load control device
41: Storage part
42: Rotation speed acquisition part
43: Load control part

The invention claimed is:

1. A specimen test apparatus that tests a specimen that is a vehicle or a part of a vehicle, the specimen test apparatus comprising:
a loading device that is connected to a rotating shaft of the specimen and gives running resistance to the rotating shaft;
a storage part that stores tire diameter data indicating a relationship between a running state of the specimen and a tire diameter during deformation; and
a load control part that acquires the running state of the specimen, calculates a tire diameter in a deformed state corresponding to the running state of the specimen based on the acquired running state and the tire diameter data, and controls the loading device with use of running resistance obtained from the calculated tire diameter in the deformed state, wherein the tire diameter in the deformed state is different than the tire diameter in an undeformed state.

2. The specimen test apparatus according to claim 1, wherein
the load control part gives running resistance corresponding to running speed obtained from the calculated tire diameter and the rotating shaft of the specimen to the loading device.

3. The specimen test apparatus according to claim 1, wherein
the tire diameter data is one indicating a relationship between at least any of rotation speed of the rotating shaft of the specimen, and running speed and acceleration of the specimen, and a tire diameter, and
from the tire diameter data, the load control part calculates a tire diameter corresponding to at least any of the rotation speed of the rotating shaft of the specimen, and the running speed and the acceleration of the specimen.

4. The specimen test apparatus according to claim 3, wherein
the load control part calculates temporary running speed or temporary acceleration from the rotation speed of the rotating shaft of the specimen and a set tire diameter, and calculates a tire diameter from the calculated temporary running speed or the calculated temporary acceleration and the tire diameter data.

5. The specimen test apparatus according to claim 3, wherein
the load control part calculates any of the rotation speed of the rotating shaft of the specimen, and the running speed and the acceleration of the specimen from a predetermined running pattern used to control the specimen, and from the tire diameter data, calculates a tire diameter corresponding to any of the rotation speed of the rotating shaft of the specimen, and the running speed and the acceleration of the specimen.

6. The specimen test apparatus according to claim 1, wherein
the specimen is a four-wheel drive vehicle drive train,
the storage part stores front wheel tire diameter data indicating a relationship between a running state of the specimen and a front wheel tire diameter and rear wheel tire diameter data indicating a relationship between a running state of the specimen and a rear wheel tire diameter,
the loading device includes a front wheel side loading device connected to a front wheel rotating shaft and a rear wheel side loading device connected to a rear wheel rotating shaft, and
the load control part calculates a front wheel tire diameter corresponding to a running state of the specimen from the front wheel tire diameter data, calculates a rear wheel tire diameter corresponding to the running state of the specimen from the rear wheel tire diameter data, and controls the respective loading devices so that running resistances calculated with use of first running speed obtained from the calculated front wheel tire diameter and rotation speed of the front wheel rotating shaft and second running speed obtained from the calculated rear wheel tire diameter and rotation speed of the rear wheel rotating shaft are given.

7. The specimen test apparatus according to claim 6, wherein
the load control part controls rotation speed of the front wheel side loading device and rotation speed of the rear wheel side loading device so that the first running speed and the second running speed coincide with each other.

8. A specimen test method that connects a loading device to a rotating shaft of a specimen that is a vehicle or a part of a vehicle, and gives running resistance to the rotating shaft to test the specimen, the specimen test method comprising:
calculating a tire diameter in a deformed state corresponding to a running state of the specimen based on an acquired running state and tire diameter data indicating a relationship between a running state of the specimen and a tire diameter during deformation, and controlling the loading device with use of running resistance obtained from the calculated tire diameter in the deformed state, wherein the tire diameter in the deformed state is different than the tire diameter in an undeformed state.

9. A tangible, non-transitory computer readable media that stores a specimen test program for connecting a loading device to a rotating shaft of a specimen that is a vehicle or a part of a vehicle, and giving running resistance to the rotating shaft to test the specimen, the specimen test program instructing a computer to comprise functions as:

a storage part that stores tire diameter data indicating a relationship between a running state of the specimen and a tire diameter during deformation; and a control part that acquires the running state of the specimen, calculates a tire diameter in a deformed state corresponding to the running state of the specimen based on the acquired running state and the tire diameter data, and controls the loading device with use of running resistance obtained from the calculated tire diameter in the deformed state, wherein the tire diameter in the deformed state is different than the tire diameter in an undeformed state.

* * * * *